Oct. 5, 1943.  S. SCHNELL  2,331,238
BOOSTER ASSISTED BRAKE ACTUATING SYSTEM
Filed March 19, 1942  2 Sheets-Sheet 1
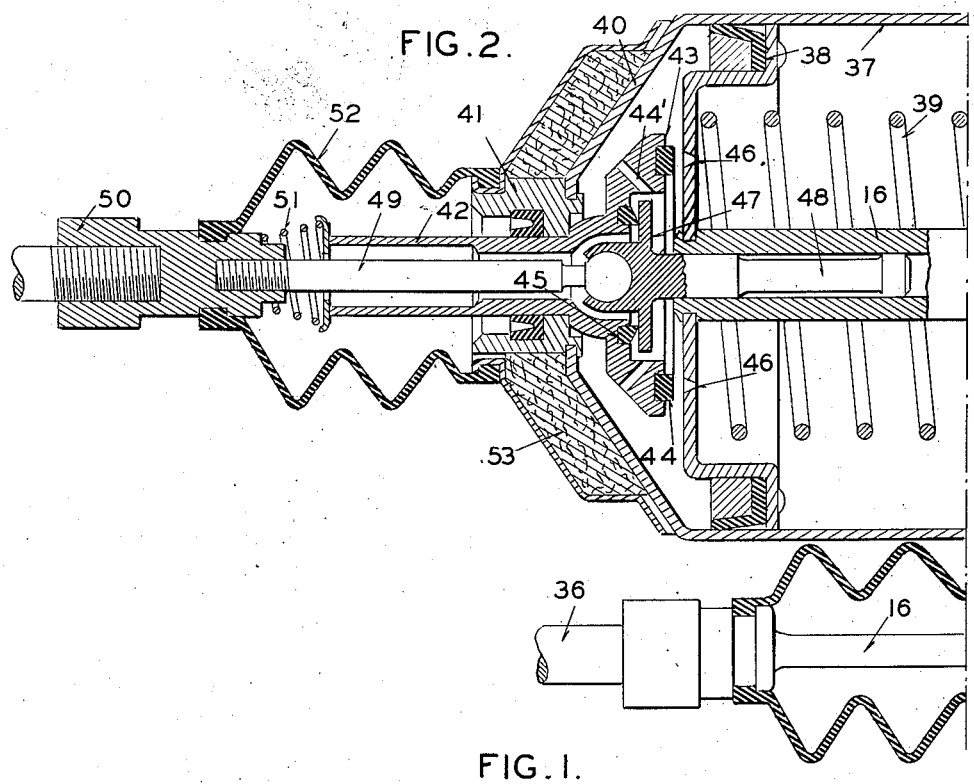
FIG. 2.
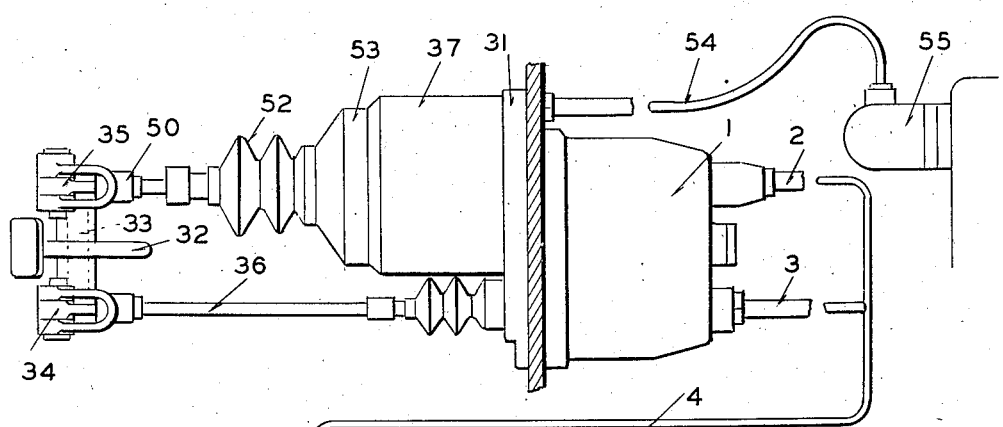
FIG. 1.
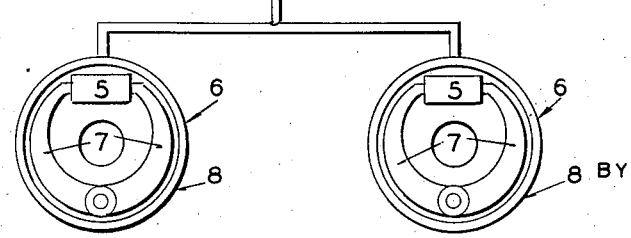
INVENTOR
STEVE SCHNELL
ATTORNEY Oct. 5, 1943.  S. SCHNELL  2,331,238
BOOSTER ASSISTED BRAKE ACTUATING SYSTEM
Filed March 19, 1942  2 Sheets-Sheet 2

INVENTOR
STEVE SCHNELL
BY
ATTORNEY

Patented Oct. 5, 1943

2,331,238

UNITED STATES PATENT OFFICE 2,331,238

BOOSTER ASSISTED BRAKE ACTUATING SYSTEM

Steve Schnell, Kirkwood, Mo., assignor to Wagner Electric Corporation, St. Louis, Mo., a corporation of Delaware Application March 19, 1942, Serial No. 435,275

8 Claims. (Cl. 60—54.5)

My invention relates to brake actuating systems and more particularly to a hydraulic brake actuating system with which a power booster is associated to assist manual effort.

One of the objects of my invention is to provide a hydraulic brake actuating system with a power booster which will be effective in assisting manual effort to apply the brakes but only until a predetermined pressure is reached in the hydraulic system.

Another and more specific object of my invention is to provide a dual master cylinder hydraulic actuating system with a power device for one of the master cylinders, which power device will be operative to actuate the master cylinder during the entire stroke of the manually-operated pedal associated with both master cylinders, but will be ineffective in causing the master cylinder it actuates to apply hydraulic pressure to the system when the pressure therein reaches a predetermined value.

Yet another object of my invention is to produce an improved brake actuating system in which the pedal travel required to initially apply the brakes is small and the manual force necessary for application is decreased without loss of proper control over the brake application.

Figure 3:
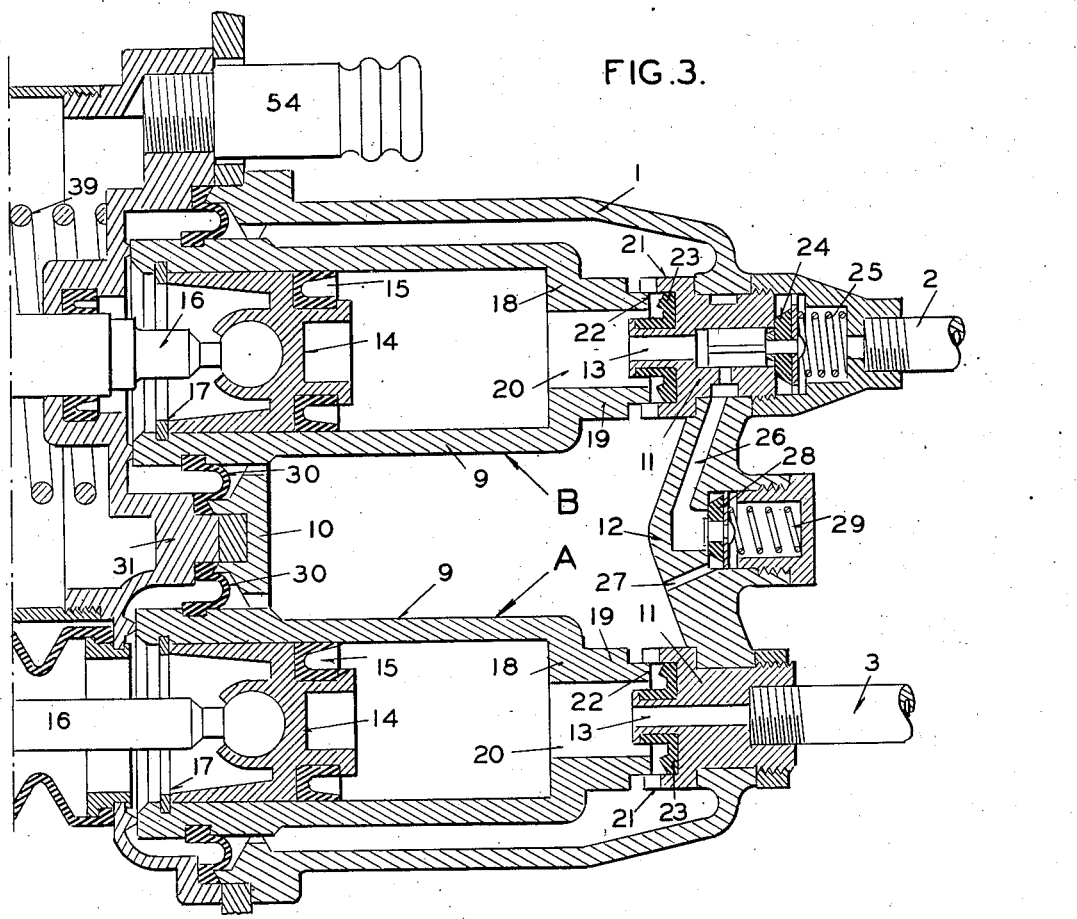
Figure 4:
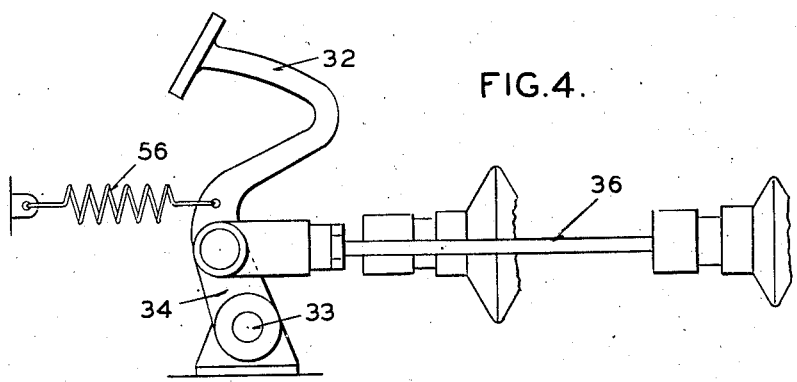

Other objects of my invention will become apparent from the following description taken in connection with the accompanying drawings in which Figure 1 is a schematic view of a brake actuating system embodying my invention; Figures 2 and 3 are longitudinal sectional views showing details of the dual master cylinders and the suction motor and control valve for actuating one of them; and Figure 4 is a side view of the pedal connections;

Referring to the drawings in detail, I indicates a reservoir casing in which are positioned like master cylinders A and B whereby the fluid pressure may be developed for actuating brakes or other devices. Branch conduits 2 and 3 connect the master cylinders to a conduit 4 leading to the wheel cylinders 5 of the brake assemblies 6 (two only being shown). These wheel cylinders, when the fluid pressure is transmitted thereto, actuate the brake shoes 7 of each brake into engagement with a drum 8 carried by each wheel of the vehicle.

The master cylinders A and B may be of any type desired but I have shown them as being of the type disclosed by Schnell Patent No. 2,258,034, issued October 7, 1941. Each master cylinder comprises a cylinder 9 mounted for limited reciprocable movement, the rear end being guided in the rear wall 10 of the reservoir casing and the forward end being guided in a plug 11 screwed into the forward wall 12 of the reservoir casing. Plug 11 is provided with a passage 13 forming the outlet of the master cylinder. In the cylinder 9 is a piston 14 carrying a sealing element 15. The piston is actuated by a piston rod 16 and when in its retracted position will engage a stop 17 carried by the rear end of the cylinder. The forward end wall 18 of the cylinder is provided with an annular extension 19 which communicates with the cylinder by a passage 20 and said annular extension telescopically fits a slotted flange 21 carried by plug 11. Thus it is seen that the forward end of the cylinder is properly supported by the plug and also capable of sliding movement in the flange of the plug. The end surface 22 of the annular flange 19 on the cylinder is adapted to cooperate with a sealing element 23 carried by the plug. When the cylinder is in its rearward position the end surface 22 will be disengaged from the sealing element 23 to thereby permit free communication between the reservoir and both the cylinder or the conduits leading to the brakes. When the cylinder is moved forwardly, the end surface 22 will engage the sealing element and cut off communication to and from the reservoir. The cylinder is caused to be moved forwardly whenever the piston 14 is moved forwardly due to the frictional drag of the packing cup 15 on the cylinder wall. After the surface 22 engages the sealing element 23, additional forward movement of the piston will result in relative movement between said piston and the cylinder and the development of fluid pressure for operating the brakes. The developed fluid pressure will act on the end wall 18 to increase the pressure engagement of the end surface 22 on the sealing element.

The outlet passage 13 of the plug 11 associated with the master cylinder B is provided with a check valve 24 biased to a closed position by a light spring 25. This check valve prevents fluid from flowing from the branch conduit 2 back into the master cylinder B but does not prevent the flow of fluid from the master cylinder to said branch line and the brakes. The outlet passage 13 of the master cylinder B also communicates with the reservoir by way of passages 26 and 27 positioned in the forward end wall of the reservoir. Associated with these passages is a pressure relief valve 28, said valve being held seated by a spring 29 of predetermined strength. Because of this relief valve fluid under pressure can only pass to the reservoir when it is of sufficient value to cause unseating of valve 28.

Fluid from the reservoir is prevented from leaking between the rear wall of the reservoir casing and each cylinder 9 by suitable sealing diaphragms 30, the diaphragms being attached at their inner peripheries to the cylinder and at their outer peripheries to the reservoir casing. The rearward movement of the cylinders is limited by their engagement with a plate 31 which is attached to the rear end of the reservoir casing.

The master cylinder A is adapted to be manually actuated by a brake pedal 32 and the master cylinder B is adapted to be actuated by power means in the form of a vacuum-operated motor, the control valve of said motor being operated by pedal 32. This pedal is secured to the center of a shaft 33, the ends of which are provided with arms 34 and 35. Arm 34 is connected by a rod 36 to piston rod 16 and piston 14 of the master cylinder A. The other arm 35 is adapted to control the suction-operated motor now to be described.

The suction motor comprises a cylinder 37 secured to plate 31 so as to have its axis coinciding with the axis of cylinder 9 of the master cylinder B. Within the cylinder is a piston 38 connected to the outer end of the piston rod 16 of said master cylinder B. A spring 39 normally biases piston 38, piston rod 16, and piston 14 of the master cylinder B to their normally inoperative positions. The outer end wall 40 of cylinder 37 is provided with a bearing plug 41 and mounted in this bearing plug is a hollow rod 42, the inner end 43 of which is bell-shaped and carries annular valve elements 44 and 45 which form part of the valve mechanism for controlling the application of suction to the suction motor. Passages 44' are provided in the bell-shaped end between elements 44 and 45 for a purpose to be later apparent. The element 44 is adapted to engage and close a plurality of holes 46 in piston 38 of the suction motor. The other element 45 is engageable by a flange 47 which is carried by a rod 48 guided in the hollow piston rod 16 of the master cylinder B. This rod 48 is connected by a ball and socket joint to a rod 49 which is positioned inside the hollow rod 42. The outer end of rod 49 is provided with a connection 50 for connecting it to the previously referred to arm 35 actuated by pedal 32. A spring 51 is interposed between rod 49 and the hollow rod 42 and normally biases rod 49 so that flange 47 will be in engagement with element 45 to prevent communication from the hollow rod 42 to the cylinder. The rods 49 and 42 are enclosed in a dust excluding boot 52 which has communication with the atmosphere through an air cleaner 53 associated with the rear end of the cylinder and carried by the guide plug 41.

The portion of cylinder 37 on the right-hand side of piston 38 is at all times in communication with the source of suction by way of a conduit 54, said source being shown, by way of example, as the manifold 55 of the internal combustion engine of the vehicle.

When the brake is inoperative, the parts are all as shown in Figure 1. Under these conditions the cylinders of the master cylinders A and B will be in communication with the interior of the reservoir casing since these cylinders 9 are at their rearward inoperative positions. The spring 39 of the suction motor holds the cylinder 9 and piston 14 of the master cylinder B in their rear positions. The piston 14 and cylinder 9 of the master cylinder A are held in their rearward positions by the pedal return spring 56. Under these conditions spring 51 will be operative to hold flange 47 against valve element 45 and cut off communication with the atmosphere. Also, valve element 44 will be held by pedal return spring 56 in order to uncover the holes 46 in the piston and thus permit communication between opposite sides of the piston. Thus suction is present on both sides of the cylinder and no force is acting on the piston tending to move it.

When it is desired to apply the brakes, pedal 32 is depressed. Movement of the pedal will immediately cause movement of piston 14 of the master cylinder A and, due to the friction drag of the cup 15 on cylinder wall 9, the cylinder will be moved forwardly with the piston and to a position where the end surface 22 will engage sealing element 23, thereby closing off communication with the reservoir. Simultaneously with the movement of piston 14 of master cylinder A, rod 49 will be moved forwardly, and because of spring 51, the hollow rod 42 will be moved forwardly. Movement of this hollow rod will result in the valve element 44 closing holes 46. Continued movement of rod 49 will result in flange 47 moving away from valve element 45 and permitting air under atmospheric pressure to enter the cylinder on the rear side of piston 38 by way of passages 44'. Thus different pressures will be established on opposite sides of piston 38 and the piston will move to the right since the greater pressure is on the rear side of the piston. Movement of this piston will move piston 14 of the master cylinder B forwardly and disconnect its cylinder 9 from the reservoir in the same manner as the cylinder of master cylinder A was disconnected. Continued movement of the pedal will now result in both pistons developing fluid under pressure and this developed fluid will be effective in the wheel cylinders 5 of the brakes to actuate them. Thus it is seen that during the actuation of the brakes, master cylinder A is being operated by manual force and master cylinder B is being operated by power. The movement of the piston of master cylinder B will always be the same as the movement of the piston of the master cylinder A and both movements will bear a direct relationship to the movement of the pedal. Whenever movement of the pedal is stopped, the movement of piston 38 will stop as the valve mechanism is of the well known "follow-up" type. As the pedal movement stops, piston 38 will move slightly forwardly until flange 27 engages valve element 45 and cuts off communication between the atmosphere and the rear side of the piston. Piston 38 will then have a slight additional movement to permit the pressures on opposite sides of the piston to be such as to hold piston 14 and maintain the developed hydraulic pressure.

When the pressure developed by piston 14 of the master cylinder B reaches a predetermined value, relief valve 28 will open and permit the fluid pressure being developed by master cylinder B to pass into the reservoir. The master cylinder B will, therefore, no longer be effective in applying pressure to the brakes and all of the pressure being applied to the brakes will be developed by the master cylinder A which is manually actuated. The valve 24 will not open to let any pressure from the master cylinder B enter the brakes due to the fact that there is a greater pressure tending to hold it closed than that tending to open it. Thus, as the pedal continues to be moved, piston 14 of the master cylinder B will also continue to be moved but will have no effect upon the braking pressure being developed.

It is seen from the foregoing description of the operation in applying the brakes that two master cylinders are effective to initially apply the brakes up to a point where predetermined pressure is obtained. By means of these two master cylinders the amount of fluid displaced is twice that of one master cylinder and thus the slack in the brakes and their initial application are obtained by a short pedal travel. Also because of the two-master cylinder arrangement each cylinder may be smaller than where only one master cylinder is employed. Because of this and the fact that the operator need only manually apply force to one of the master cylinders, less manual effort is necessary to apply the brakes up to the predetermined pressure where the power-operated master cylinder is no longer effective.

When it is desired to release the brakes, the operator releases the foot pedal. This will result in the return of the parts to their positions as shown in Figure 1. Initial return movement of the pedal will cause piston 14 to move rearwardly in cylinder 9 of master cylinder A. However, the cylinder will not be moved rearwardly therewith due to the fluid pressure in the cylinder. As the piston moves rearwardly, the fluid will return to the cylinder and the brakes will be released. When the piston engages stop 27, surface 22 will become disengaged from the sealing element 23 to permit release of the excess fluid to the reservoir. Initial return movement of the pedal also will result in the atmosphere being cut off from the rear side of the suction motor of the piston and the portions of the cylinder on both sides of the piston connected with the source of suction. The spring 39 will thus be effective to return the suction motor piston 38 and piston 14 of the master cylinder B to their inoperative positions. As piston 14 of the master cylinder B initially moves rearwardly, it will, due to frictional drag of the cup and absence of fluid pressure in cylinder 9, carry with it said cylinder and cause it to be connected to the reservoir. Thus fluid can flow into the cylinder as the piston returns. Fluid pressure developed in the brake lines as pistons 14 of both master cylinders move rearwardly will return only by way of master cylinder A since the check valve 24 prevents any return by way of master cylinder B.

If, at any time during the depressing stroke of the pedal, it is desired to release the brakes slightly, this can be accomplished by releasing the brake pedal. Also, if it is desired to hold the brakes applied with a low pressure, this pressure being below that at which the relief valve 28 opens, this may be done by merely stopping the movement of the pedal. When this occurs, the valves for the suction motor will be so controlled as to stop the movement of piston 38. When the pedal is stopped, piston 38 will move slightly forwardly until flange 47 engages valve element 45 and cuts off communication between the atmosphere and the rear side of the piston. Piston 38 will then continue to slightly move until the holes 46 are uncovered sufficiently to cause the differential pressure to be just the proper amount to hold the piston 14 of master cylinder B against the pressure already developed in cylinder 9.

In the event of total or partial failure of the source of vacuum, the master cylinder B may be actuated manually from the brake pedal as there will be a direct manual connection between the rod 49 and piston rod 18 of the master cylinder B as flange 47 can engage the end of the piston rod after a predetermined movement. When the master cylinder B develops the predetermined pressure, the relief valve 28 will be opened in the same manner as previously described. The only difference in the operation is that the operator will be required to move both of the pistons of the master cylinders by manual force during the brake application. The manual force, however, required to move the piston of the master cylinder B after the pressure relief valve opens, will be a fixed value.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system for actuating a device, two cylinders connected to communicate with the device, pistons in the cylinders, a manually-actuated member connected to actuate one piston, power means for actuating the other piston, means including "follow-up" control means for so controlling the power means by the manually-actuated member that its actuated piston will be moved substantially simultaneously with and to the same extent as the other piston when said manually-actuated member is moved, and means for preventing the fluid pressure being developed by the power-actuated piston from being effective to actuate the device when the pressure actuating said device reaches a predetermined value.

2. In a fluid pressure system for actuating a device, two cylinders connected to communicate with the device, pistons in the cylinders, a manually-actuated member connected to operate one piston, power means for actuating the other piston, means including "follow-up" control means for controlling the movement of said power means and other piston by the manual member so that it will bear a direct relationship to the movement of the manual member and the other piston throughout the entire extent of movement of said manual member, and means for relieving the pressure being developed by the power-actuated piston when a predetermined pressure is reached and for causing all additional fluid pressure employed to actuate the device to be developed solely by the manually-actuated piston.

3. In a fluid pressure system, two master cylinders, a device to be actuated, conduit means between both master cylinders and the device, power means for actuating one master cylinder, a manually-operated member connected to actuate the other master cylinder, means including "follow-up" control means for controlling the operation of the power means by the manually-operated member so that said power means will operate the associated master cylinder in accordance with movement of the manually-operated member, and means operable when the power-operated master cylinder develops a predetermined fluid pressure for preventing the fluid pressure developed by said master cylinder from being transmitted to the actuated device notwithstanding the master cylinder continues to be actuated by the power means and thus permit said device to be subsequently actuated by the manual actuation only of the other master cylinder.

4. In a fluid pressure system for actuating a device, two cylinders connected to communicate with the device, pistons in the cylinders, a manually-actuated member connected to operate one piston, power means for actuating the other piston, means including "follow-up" control means for controlling the movement of said power means and other piston by the manual member so that it will bear a direct relationship to the movement of the manual member and the other piston throughout the extent of movement of said manual member, and means for relieving the pressure being developed by the power-actuated piston when a predetermined pressure is reached and for causing all additional fluid pressure employed to actuate the device to be developed solely by the manually-actuated piston, said means comprising a pressure-operated relief valve and a check valve for preventing return flow of fluid under pressure from the device to the power-actuated master cylinder.

5. In a fluid pressure system, two master cylinders including a common reservoir, a device to be actuated, conduit means between both master cylinders and the device, fluid pressure power means including a movable element for actuating one master cylinder, a manually-operated member connected to actuate the other master cylinder, control means for the power means including "follow-up" valve mechanism so controlled by the manually-operated member and the movable element of the power means that the extent of movement of the movable element of the power means coincides with that of the manual member throughout the entire stroke of the latter, and means operable when the power-operated master cylinder develops a predetermined fluid pressure for placing said master cylinder in communication with the reservoir and thus permit said device to be subsequently actuated by the manual actuation of the other master cylinder only.

6. In a fluid pressure system, two master cylinders, a device to be actuated, conduit means between both master cylinders and the device, a fluid motor for actuating one master cylinder, a source of fluid pressure other than atmosphere, a manually-operated member connected to actuate the other master cylinder, a follow-up valve for controlling the fluid motor by the source, means for operating said follow-up valve by the manually-operated member, and means operable upon a predetermined pressure being developed to actuate the device for relieving the pressure being developed by the fluid motor actuated piston only and thereby permit the manually-actuated master cylinder to develop all additional fluid pressure employed to actuate the device notwithstanding the continued actuation by the fluid motor of its associated master cylinder.

7. In a fluid pressure system, two master cylinders, a device to be actuated, conduit means between both master cylinders and the device, a check valve associated with one master cylinder for preventing fluid from returning thereto from the device, a vacuum motor connected to actuate the piston of one master cylinder, a source of suction connected to the motor, a pedal, a mechanical connection between the pedal and the piston of each master cylinder, means providing a lost motion in the connection between the pedal and the vacuum motor actuated master cylinder, a follow-up valve mechanism associated with the connection having the lost motion and so controlling the operation of the suction motor by the source that the vacuum motor will actuate the piston of said one master cylinder simultaneously with and to the same extent as the piston of the other master cylinder is actuated when the pedal is moved, and means for relieving the fluid pressure developed by the vacuum-operated master cylinder when the pressure reaches a predetermined value.

8. In a fluid pressure system, two master cylinders including a common reservoir, a device to be actuated, conduit means between both master cylinders and the device, a check valve associated with one master cylinder for preventing fluid from returning thereto from the device, a vacuum motor connected to actuate the piston of one master cylinder, a source of suction connected to the motor, a pedal, a mechanical connection between the pedal and the piston of each master cylinder, means providing a lost motion in the connection between the pedal and the vacuum motor actuated master cylinder, a follow-up valve mechanism associated with the connection having the lost motion and so controlling the operation of the suction motor by the source that the vacuum motor will actuate the piston of said one master cylinder simultaneously with and to the same extent as the piston of the other master cylinder is actuated when the pedal is moved, and means comprising a pressure-controlled relief valve for placing the vacuum-operated master cylinder in communication with the common reservoir when the pressure reaches a predetermined value.

STEVE SCHNELL.